Jan. 9, 1923.                                                                1,441,274.
W. A. GEIGER.
FRICTION SHOCK ABSORBING MECHANISM.
FILED JUNE 13, 1921.
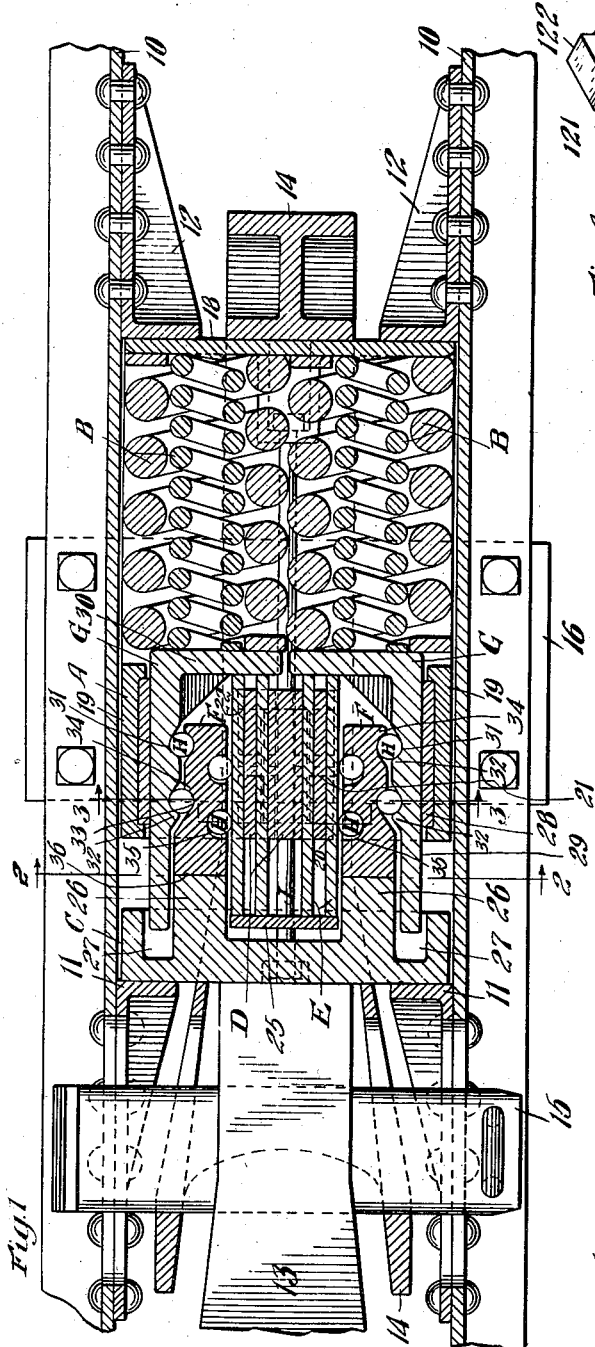
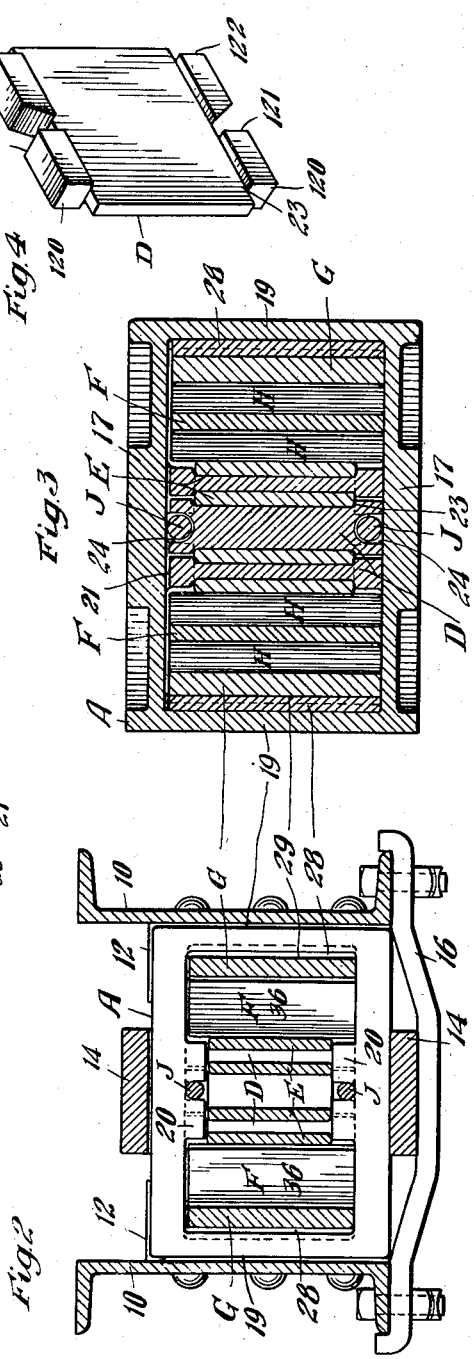
Witnesses
Hans M. Rachlitz
Inventor
William A. Geiger
By Geo. I. Haight
His Atty.

Patented Jan. 9, 1923.

1,441,274

UNITED STATES PATENT OFFICE.

WILLIAM A. GEIGER, OF CHICAGO, ILLINOIS, ASSIGNOR TO WILLIAM H. MINER, OF CHAZY, NEW YORK.

FRICTION SHOCK-ABSORBING MECHANISM.

Application filed June 13, 1921. Serial No. 476,999.

*To all whom it may concern:*

Be it known that I, WILLIAM A. GEIGER, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a high capacity friction shock absorbing mechanism especially adapted for railway draft riggings, and wherein are employed large frictional wearing areas and anti-friction means within the wedging system to insure sensitiveness of action both in compression and release.

More specifically, an object of the invention is to provide a friction shock absorbing mechanism of the intercalated friction plate type so arranged that there are a series of intercalated plates centrally disposed of the mechanism, and, in addition, outer sets of co-operating friction surfaces with appropriate duplicate sets of wedging systems co-operable with all of the friction elements.

In the drawing forming a part of this specification, Figure 1 is a longitudinal horizontal sectional view of a portion of a railway draft rigging showing my improvement in connection therewith. Figure 2 is a vertical transverse sectional view corresponding substantially to the line 2—2 of Figure 1. Figure 3 is an enlarged vertical transverse sectional view of the shock absorbing mechanism proper taken substantially on the line 3—3 of Figure 1. And Figure 4 is a detail perspective of one of the stationary friction plates employed in my arrangement.

In said drawing, 10—10 denote channel draft sills of a railway car, to the inner faces of which are secured front stop lugs 11 and rear stop lugs 12. A portion of a drawbar is indicated at 13, the same being operatively associated with the shock absorbing mechanism proper by a hooded cast yoke 14 and a coupler key 15. The yoke and mechanism within are supported by a detachable saddle plate 16.

The improved shock absorbing mechanism proper, as shown, comprises, broadly, a casting A; twin springs B—B; a front follower C; a series of relatively stationary friction plates D—D; a series of relatively movable friction plates E—E; a pair of wedge elements F—F; a pair of combined wedge-friction-shoe-spring followers G—G; anti-friction rollers H—H; and retainer bolts J—J.

The casting A, as shown, is formed with upper and lower parallel walls 17—17, united at the rear of the casting by a vertical integral wall 18 acting as a rear follower, and side walls 19—19. The latter are relatively short so as to leave the major portion of the sides of the casting A open to permit insertion and removal of the springs and certain parts of the wedging system. From the preceding description, it will be seen that the casting A is formed at the forward or outer end thereof with what may be termed a hollow rectangular shell or casing. Said member A, as an entirety, may be variously termed a column-load-sustaining member, a follower-acting member, or a combined friction shell and spring cage, inasmuch as the springs B are housed therewithin.

Within the casing part of the casting A, the top and bottom walls 17—17 are provided with transversely-extending vertically-alined ribs 20, 21 and 22, providing suitable shoulders to co-operate with corresponding shoulders 120, 121 and 122 on the top and bottom edges of the stationary plates D. In this manner, the plates D are anchored against longitudinal movement with respect to the casting A, but are, nevertheless, responsive to laterally-applied pressure.

The plates D are thickened at their top and bottom edges, as clearly shown in Figure 3, so as to provide longitudinally-extending channels or guides 23—23 on opposite sides thereof. The central friction plate D is preferably made appreciably thicker than either of the side plates D, for the reason that the upper and lower edges thereof are recessed, as indicated at 24—24 to accommodate the retainer bolts J.

The movable plates E are of rectangular form preferably cut in suitable lengths from strips. The plates E are alternated with respect to the stationary plates D, and, in normal position of the parts, the plates E are extended both forwardly and rearwardly of the plates D. At their forward or outer ends, the plates E are covered by a loose hard metal plate 25 of a thickness somewhat less than the normal space between the follower C and the outer ends of the plates E to provide for a slight spacing of the plate with reference to either the follower C or the outer ends of the plates E, depending upon the position assumed by the plate 25, upon release of the gear. Fig. 1 illustrates the plate 25 as spaced from the inner surface of the follower C.

The follower C is of special construction and is formed on its inner side with laterally-spaced inwardly-projecting pressure-transmitting lugs 26—26. On the outer side of each lug 26, the follower is recessed, as indicated at 27, to house and accommodate the outer ends of the elements G. The lugs 26 straddle the movable friction plates E.

Each side wall 19 of the casting A is provided on the inner side thereof with a plate insert 28, providing on its inner side a longitudinally-extending flat friction surface. The latter are adapted to co-operate with the correspondent flat friction surfaces 29 formed on the outer sides of the elements G.

Each of said elements G, in addition to having the friction surface 29, is formed at its inner end with a transversely-extending heavy flange 30 which acts as a spring follower interposed between one of the corresponding springs B and the inner ends of the friction plates. On its inner side, each element G is formed with a pair of wedge roller seats 31—31, on which ride the corresponding anti-friction rollers H. Limiting shoulders 32—32 are formed at the outer end of the roller seats 31 to assist in maintaining the anti-friction rollers in proper position.

The wedge elements F are of like construction and symmetrically-disposed on opposite sides of the central group of friction plates. Each element F is formed, on the outer side thereof, with a pair of parallel wedge roller seats 33—33 opposite the roller seats 31 and with corresponding oppositely-disposed limiting stop shoulders 34—34. On its inner side—that is, the side adjacent the group of friction plates, each element F is formed with a pair of recesses 35—35 to accommodate the inner set of anti-friction rollers H. The recesses 35 are sufficiently elongated parallel to the center line of the mechanism to permit a free true rolling movement of the rollers H, and the depth of such recesses 35 is made less than the diameter of the rollers, so that the latter will project out from the elements F and have rolling engagement with the corresponding adjacent outermost movable plates E. At its outer end, each element F has a transverse face 36 bearing against the inner end of the corresponding lug 26 of the follower C.

The retainer bolts J are anchored at their forward ends in suitable sockets in the follower C and at their inner ends are anchored in suitable hollow bosses provided in the back wall 18 of the casting A. Said bolts are employed to maintain the parts in assembled relation and also to place the springs under initial compression when desired.

The operation is as follows, assuming an inward or buffing movement of the drawbar.

As the drawbar moves inwardly, the follower C is forced in the same direction simultaneously and uniformly therewith. Owing to the fact that the follower C is free to move a limited distance independent of the plates E and also independently of the elements G, there will be, initially, no actuation of the movable plates E. On the contrary, the initial part of the compression stroke will result in a wedging action being set up between the wedge elements F and wedge shoes G, the latter being yieldingly resisted by the springs B. Prior to the follower C engaging with the plate 25, the elements G will have started to move inwardly of the casting A, thus freeing the inner ends of the elements G from the inner ends of the plates E. After the wedging or lateral pressure has thus been set up, the follower C will ultimately engage the plate 25 and thereafter actuate the plates E, thus generating friction between the movable and stationary plates. Auxiliary to this will, of course, be the friction generated between the elements G and the side plates 28—28. At no time does the follower C directly engage or push either of the elements G. The limit of the compression stroke occurs when the follower C engages with the outer end of the casting A. Upon removal of the actuating force the release action is initiated by the springs B reacting through the elements G and thence through the anti-friction rollers and elements F to the follower C. A limited amount of movement of all of said parts constituting the wedging system is allowed independently of the plates E and until the flanges 30 of the elements G finally engage the inner ends of the plates E. By the time the latter action occurs the transverse pressure on the friction elements will have been reduced substantially to a minimum, and thereafter the plates E may be readily projected outwardly to their normal position.

On account of the use of a pair of anti-friction rollers between each element F and group of friction plates, and between each element F and corresponding element G, the pressure per unit of length of contact on the rollers is maintained at a comparatively small figure, thus eliminating any danger of crushing of the rollers or indentation of any of the surfaces. The anti-friction rollers also render the mechanism extremely sensitive both in setting up the wedging action and in facilitating the release. By having all of the plates of the central group freely responsive to lateral pressure, I am enabled to compensate for any irregularities in thickness of any of the parts taken transverse through the casing of the casting A, and thereby insure all of the plates, and the elements G and plates 28 having full surface contact at all times.

I have herein shown and described what I now consider the preferred manner of carrying out the invention, but the same is merely illustrative and I contemplate all changes and modifications that come within the scope of the claims appended hereto.

I claim:

1. In a friction shock absorbing mechanism, the combination with a load-sustaining member having a hollow casing provided on the interior thereof with opposed longitudinally-extending friction surfaces; of a spring resistance; a group of centrally-located intercalated relatively stationary and movable friction plates mounted in said casing; an outer follower; and a lateral-pressure-creating system on each side of said central group of friction plates, each system including a combined wedge-friction-shoe-spring follower arranged to frictionally co-operate with the corresponding adjacent friction surface of the casing.

2. In a friction shock absorbing mechanism, the combination with a load-sustaining member having a hollow casing provided on the interior thereof with opposed longitudinally-extending friction surfaces; of a spring resistance; a group of centrally-located intercalated relatively stationary and movable friction plates mounted in said casing; an outer follower; and a lateral-pressure-creating system on each side of said central group of friction plates, said pressure-creating systems having a limited amount of movement lengthwise of the mechanism independent of any movement of said movable friction plates during initial portions of both compression and release actions.

3. In a friction shock absorbing mechanism, the combination with a load-sustaining member having a hollow casing provided on the interior thereof with opposed longitudinally-extending friction surfaces; of a spring resistance; a group of centrally-located intercalated relatively stationary and movable friction plates mounted in said casing; an outer follower; and a lateral-pressure-creating system on each side of said central group of friction plates, each system including, a wedge element directly actuated by said follower and a combined wedge-friction-shoe-spring follower on the outer side of the wedge element, said wedge-friction-shoe-spring follower frictionally co-operating with the corresponding adjacent friction surface of the casing.

4. In a friction shock absorbing mechanism, the combination with a load-sustaining member having a hollow casing provided on the interior thereof with opposed longitudinally-extending friction surfaces; of a twin spring resistance; a group of centrally-located intercalated relatively stationary and movable friction plates mounted in said casing; an outer follower; and a lateral-pressure-creating system on each side of said central group of friction plates, each system including, a wedge element directly actuated by said follower and a combined wedge-friction-shoe-spring follower on the outer side of the wedge element, said wedge-friction-shoe-spring follower frictionally co-operating with the corresponding adjacent friction surface of the casing and coacting with one member of said twin spring resistance, said pressure-creating systems having a limited amount of movement lengthwise of the mechanism independent of any movement of said movable friction plates during initial portions of both compression and release actions.

5. In a friction shock absorbing mechanism, the combination with a load-sustaining member having a hollow casing provided on the interior thereof with opposed longitudinally extending friction surfaces; a series of centrally located friction elements carried by said member and held against longitudinal movement with respect thereto; an outer follower; a series of relatively movable friction plates intercalated with respect to the friction elements of the first series and movable longitudinally relatively to said member, said intercalated elements constituting a single central group; a lateral pressure-creating system on each side of said central group of friction elements, each system including, a wedge element and a combined wedge friction shoe on the outer side of the wedge element, said wedge friction shoe frictionally co-operating with the corresponding adjacent friction surface of the casing; an outer follower and a spring resistance co-acting with said pressure-creating system.

6. In a friction shock absorbing mechanism, the combination with a follower-acting member having a hollow casing at one end thereof and a spring cage at one end of the casing, said casing having interior opposed longitudinally-extending friction surfaces; of a spring resistance within said cage; a series of stationary friction plates; a series of movable friction plates alternated with said stationary plates and normally projecting outwardly from the casing; an outer main follower normally spaced a slight distance from the outer projecting ends of the movable plates; a floating wedge element on each side of the friction plates, said wedge element having direct bearing on said follower; anti-friction rollers interposed between each said wedge element and adjacent friction plate; a member on the outer side of each wedge element, said member having an outer longitudinally-extending friction surface co-operable with the corresponding adjacent friction surface of the casing and provided also at its inner end with a transverse spring follower section, said member being provided on the inner side thereof with a plurality of wedge faces; and a plurality of anti-friction rollers between each said member and corresponding wedge element.

In witness that I claim the foregoing I have hereunto subscribed my name this 1st day of June, 1921.

WILLIAM A. GEIGER.

Witnesses:
 CARRIE GAILING,
 ANN BAKER.